US009836783B2

(12) United States Patent
Currivan et al.

(10) Patent No.: US 9,836,783 B2
(45) Date of Patent: Dec. 5, 2017

(54) METHOD AND SYSTEM FOR CONTENT SELECTION, DELIVERY AND PAYMENT

(75) Inventors: Bruce Currivan, Dove Canyon, CA (US); Kenneth Ma, Cupertino, CA (US); Wael William Diab, San Francisco, CA (US); Jeyhan Karaoguz, Irvine, CA (US); Yongbum Kim, San Jose, CA (US); Michael Johas Teener, Santa Cruz, CA (US)

(73) Assignee: AVAGO TECHNOLOGIES GENERAL IP (SINGAPORE) PTE. LTD., Singapore (SG)

( * ) Notice: Subject to any disclaimer, the term of this patent is extended or adjusted under 35 U.S.C. 154(b) by 1317 days.

(21) Appl. No.: 12/756,863

(22) Filed: Apr. 8, 2010

(65) Prior Publication Data

US 2011/0022526 A1 Jan. 27, 2011

Related U.S. Application Data

(60) Provisional application No. 61/228,322, filed on Jul. 24, 2009.

(51) Int. Cl.
*H04L 12/24* (2006.01)
*G06Q 30/06* (2012.01)
(Continued)

(52) U.S. Cl.
CPC ... *G06Q 30/0645* (2013.01); *G06F 17/30017* (2013.01); *G06F 17/3074* (2013.01);
(Continued)

(58) Field of Classification Search
CPC . G06Q 30/0645; H04L 12/14; H04L 41/5029; H04L 41/5054; H04L 41/5051;
(Continued)

(56) References Cited

U.S. PATENT DOCUMENTS 5,220,674 A * 6/1993 Morgan et al. ............... 709/223
5,884,046 A * 3/1999 Antonov ....................... 709/238
(Continued)

FOREIGN PATENT DOCUMENTS

CN 1317217 A 10/2001
CN 1489736 A 4/2004
(Continued)

OTHER PUBLICATIONS

European Patent Office, Communication with partial European Search Report (R 64 EPC), in Application No. EP10007245.3-2414, dated Dec. 3, 2010.
(Continued)

*Primary Examiner* — Le H Luu
(74) *Attorney, Agent, or Firm* — McDermott Will & Emery LLP

(57) ABSTRACT

Aspects of a method and system for content selection, delivery and payment may comprise a management entity that coordinates operation of one or more endpoint devices. The one or more endpoint devices may be operable to select one or more parameters associated with a particular content type from the management entity. The particular content type may specify a type of media content that is handled by the one or more endpoint devices. The one or more endpoint devices may be operable to receive configuration information from the management entity based on the selected one or more parameters associated with the particular content type. The one or more endpoint devices may be configured utilizing the received configuration information. The one or more endpoint devices may be operable to pay for the received configuration information.

22 Claims, 7 Drawing Sheets

(51) Int. Cl.
*H04N 21/20* (2011.01)
*G06F 17/30* (2006.01)
*H04L 12/14* (2006.01)

(52) U.S. Cl.
CPC .. *G06F 17/30244* (2013.01); *G06F 17/30781* (2013.01); *H04L 12/14* (2013.01); *H04L 41/5029* (2013.01); *H04L 41/5051* (2013.01); *H04L 41/5054* (2013.01); *H04N 21/20* (2013.01); *H04M 2215/0168* (2013.01); *H04M 2215/22* (2013.01)

(58) Field of Classification Search
CPC ...... H04M 2215/22; H04M 2215/0168; H04N 21/20; G06F 17/30017; G06F 17/30244; G06F 17/30781; G06F 17/3074
See application file for complete search history.

(56) References Cited

U.S. PATENT DOCUMENTS

| | | | |
|---|---|---|---|
| 6,049,828 A * | 4/2000 | Dev et al. | 709/224 |
| 6,154,787 A * | 11/2000 | Urevig et al. | 710/8 |
| 6,167,445 A * | 12/2000 | Gai et al. | 709/223 |
| 6,310,889 B1 | 10/2001 | Parsons et al. | 370/466 |
| 6,430,602 B1 * | 8/2002 | Kay et al. | 709/206 |
| 6,430,711 B1 * | 8/2002 | Sekizawa | 714/47.2 |
| 6,452,692 B1 * | 9/2002 | Yacoub | 358/1.15 |
| 6,463,454 B1 * | 10/2002 | Lumelsky et al. | 718/105 |
| 6,470,384 B1 * | 10/2002 | O'Brien et al. | 709/223 |
| 6,499,049 B2 * | 12/2002 | Waldo et al. | 718/104 |
| 6,512,761 B1 * | 1/2003 | Schuster et al. | 370/352 |
| 6,552,813 B2 * | 4/2003 | Yacoub | 358/1.1 |
| 6,560,609 B1 | 5/2003 | Frey et al. | |
| 6,578,160 B1 * | 6/2003 | MacHardy et al. | 714/43 |
| 6,594,684 B1 * | 7/2003 | Hodjat et al. | 709/202 |
| 6,625,643 B1 * | 9/2003 | Colby et al. | 709/217 |
| 6,654,759 B1 | 11/2003 | Brunet et al. | |
| 6,654,807 B2 * | 11/2003 | Farber et al. | 709/225 |
| 6,714,987 B1 * | 3/2004 | Amin et al. | 709/249 |
| 6,732,117 B1 | 5/2004 | Chilton | |
| 6,742,015 B1 * | 5/2004 | Bowman-Amuah | 718/101 |
| 6,751,662 B1 * | 6/2004 | Natarajan et al. | 709/223 |
| 6,816,905 B1 * | 11/2004 | Sheets et al. | 709/226 |
| 6,954,739 B1 * | 10/2005 | Bouillet et al. | 705/63 |
| 6,963,285 B2 * | 11/2005 | Fischer et al. | 340/635 |
| 7,023,825 B1 * | 4/2006 | Haumont et al. | 370/338 |
| 7,096,248 B2 * | 8/2006 | Masters et al. | 709/201 |
| 7,171,654 B2 * | 1/2007 | Werme et al. | 717/130 |
| 7,181,302 B2 * | 2/2007 | Bayne | 700/96 |
| 7,181,743 B2 * | 2/2007 | Werme et al. | 718/104 |
| 7,283,935 B1 * | 10/2007 | Pritchard et al. | 702/186 |
| 7,340,654 B2 * | 3/2008 | Bigagli et al. | 714/47.2 |
| 7,433,931 B2 * | 10/2008 | Richoux | 709/217 |
| 7,587,512 B2 * | 9/2009 | Ta et al. | 709/233 |
| 7,770,002 B2 * | 8/2010 | Weber | 713/159 |
| 2002/0072974 A1 * | 6/2002 | Pugliese et al. | 705/14 |
| 2002/0131404 A1 * | 9/2002 | Mehta et al. | 370/352 |
| 2002/0152305 A1 * | 10/2002 | Jackson et al. | 709/224 |
| 2003/0126240 A1 * | 7/2003 | Vosseler | 709/221 |
| 2003/0126265 A1 * | 7/2003 | Aziz et al. | 709/227 |
| 2003/0140143 A1 * | 7/2003 | Wolf et al. | 709/225 |
| 2003/0204758 A1 * | 10/2003 | Singh | 713/320 |
| 2003/0236745 A1 * | 12/2003 | Hartsell et al. | 705/40 |
| 2004/0095237 A1 * | 5/2004 | Chen et al. | 340/506 |
| 2004/0103339 A1 * | 5/2004 | Chalasani et al. | 714/4 |
| 2004/0177276 A1 * | 9/2004 | MacKinnon et al. | 713/201 |
| 2004/0213220 A1 * | 10/2004 | Davis | 370/389 |
| 2005/0097445 A1 * | 5/2005 | Day et al. | 715/501.1 |
| 2005/0182838 A1 * | 8/2005 | Sheets et al. | 709/226 |
| 2006/0056304 A1 * | 3/2006 | Moore | 370/252 |
| 2006/0075042 A1 * | 4/2006 | Wang et al. | 709/206 |
| 2008/0300890 A1 * | 12/2008 | Dawson et al. | 705/1 |
| 2008/0320141 A1 * | 12/2008 | Brownrigg, Jr. | 709/226 |
| 2009/0279545 A1 * | 11/2009 | Moonen | H04L 29/06027 370/389 |

FOREIGN PATENT DOCUMENTS

| | | |
|---|---|---|
| EP | 1 253 772 A2 | 10/2002 |
| EP | 1253772 A2 * | 10/2002 |
| WO | WO 00/10357 A1 | 2/2000 |

OTHER PUBLICATIONS

Office Action issued in Taiwan patent application No. 099124395, dated Mar. 17, 2014.

S. Jarusombat and S. Kittitornkun, "Digital Signature on Mobile Devices based on Location," International Symposium on Communications and Information Technologies, 2006, Sep. 2006, 5 pages.

Office Action issued in Chinese patent application No. 201010231224.5, dated Nov. 20, 2012, 6 pages.

Office Action issued in corresponding Chinese patent application No. 201010231224.5, dated Jun. 8, 2015.

* cited by examiner

| | | 304 | 306 | 308 | 310 | 312 | 314 | 316 | 318 | 320 | 322 |
|---|---|---|---|---|---|---|---|---|---|---|---|
| | | Name / Description | Service Class | GNSS coordinates | Bandwidth usage | Applications accessed | Time period at which applications accessed | Device capabilities | Services leased | Time period at which services leased | Latency |
| 302a | | xxxxxxxxxx | xxxxxxxx | N:dd mm.sss<br>W:dd mm.sss | xxxxxxxx | xxxxxxxx | xxxxxxxx | xxxxxxxx | xxxxxxxx | xxxxxxxx | xxxxxxxx |
| 302b | | xxxxxxxxxx | xxxxxxxx | N:dd mm.sss<br>W:dd mm.sss | xxxxxxxx | xxxxxxxx | xxxxxxxx | xxxxxxxx | xxxxxxxx | xxxxxxxx | xxxxxxxx |
| 302c | | xxxxxxxxxx | xxxxxxxx | N:dd mm.sss<br>W:dd mm.sss | xxxxxxxx | xxxxxxxx | xxxxxxxx | xxxxxxxx | xxxxxxxx | xxxxxxxx | xxxxxxxx |

Registry

METHOD AND SYSTEM FOR CONTENT SELECTION, DELIVERY AND PAYMENT

CROSS-REFERENCE TO RELATED APPLICATIONS/INCORPORATION BY REFERENCE

This application makes reference to, claims priority to, and claims benefit of U.S. Provisional Application Ser. No. 61/228,322, filed Jul. 24, 2009.

FIELD OF THE INVENTION

Certain embodiments of the invention relate to communications. More specifically, certain embodiments of the invention relate to a method and system for content selection, delivery and payment.

BACKGROUND OF THE INVENTION

Electronic communication networks are becoming an increasingly popular means of exchanging data of various types, sizes for a variety of applications and business and consumers alike want network access on more and more devices. Moreover, consumers and business continually want faster network access and/or greater bandwidth on all of their communication devices. Consequently, as more and more devices are being equipped to access communication networks, network administrators and service providers are presented with the challenge of effectively serving an increasing number of devices having and increasingly diverse set of capabilities utilizing an increasing diverse collection of protocols, software, and/or other networking and computing resources.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for content selection, delivery and payment, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

BRIEF DESCRIPTION OF SEVERAL VIEWS OF THE DRAWINGS

FIG. 3 is a diagram illustrating an exemplary registry in a management entity, in accordance with an embodiment of the invention.

DETAILED DESCRIPTION OF THE INVENTION

Certain embodiments of the invention may be found in a method and system for content selection, delivery and payment. In various embodiments of the invention, a communication system may comprise a management entity that coordinates operation of one or more endpoint devices. The one or more endpoint devices may be operable to select one or more parameters associated with a particular content type from the management entity. The particular content type may specify a type of media content that is handled by the one or more endpoint devices. The one or more endpoint devices may be operable to receive configuration information from the management entity based on the selected one or more parameters associated with the particular content type. The one or more endpoint devices may be configured utilizing the received configuration information. The one or more endpoint devices may be operable to provide payment and/or payment related information for the received configuration information.

In accordance with another embodiment of the invention, the one or more parameters associated with the particular content type may comprise one or more of a bandwidth, a latency, a service class, one or more applications, a time period of accessing the one or more applications, one or more services, and/or a time period of leasing the one or more services. The received configuration information may comprise one or both of the one or more applications for the time period of accessing the one or more applications and/or one or more services for the time period of leasing the one or more services. The one or more endpoint devices may be operable to pay for the received configuration information based on one or both of the selected bandwidth and/or the selected service class associated with the particular content type. The one or more endpoint devices may be operable to communicate a global navigation satellite system (GNSS) location of each of the one or more endpoint devices to the management entity. The one or more endpoint devices may be operable to provide payment and/or payment related information for the received configuration information based on the GNSS location of the one or more endpoint devices. The one or more endpoint devices may be operable to receive the selected one or more parameters via one or both of a wireless and/or a wired connection. The management entity may be one or both of a content provider and/or a service provider.

Figure 1A:
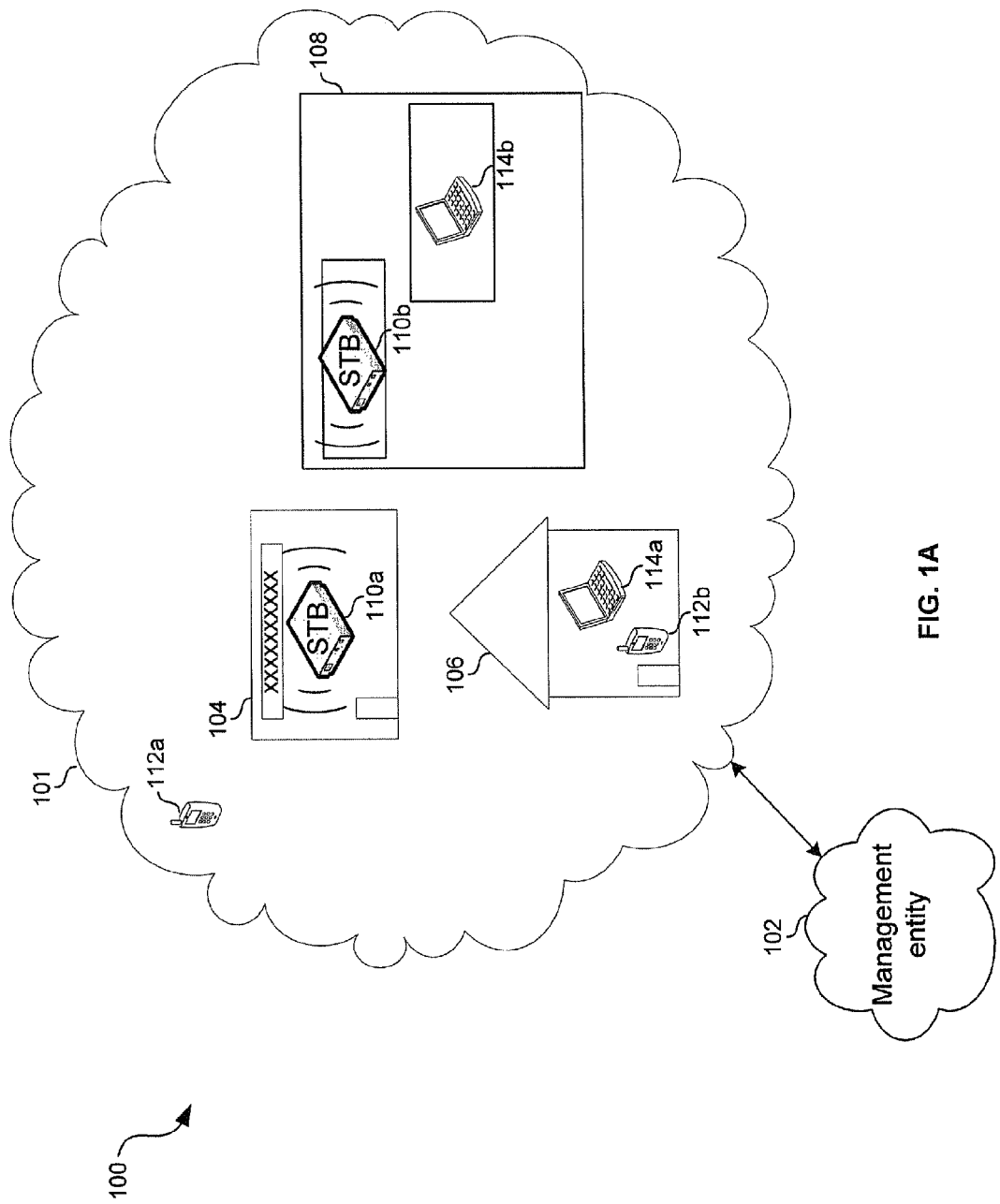
FIG. 1A is a diagram illustrating a system for content selection, delivery and payment, in accordance with an embodiment of the invention.

FIG. 1A is a diagram illustrating a system for content selection, delivery and payment, in accordance with an embodiment of the invention. Referring to FIG. 1A, there is shown a communication system 100 comprising a sub-network 101, and a management entity 102. The exemplary sub-network 101 may comprise a plurality of endpoint devices. Exemplary endpoint devices may comprise media players, HD television systems, video and/or still cameras, game consoles, set-top boxes (STBs), cell phones, laptops, televisions sets, display devices and/or location determination enabled devices. For example, the sub-network 101 may comprise a plurality of STBs 110a and 110b, which are collectively referred to herein as STBs 110, a plurality of cell phones 112a and 112b, which are collectively referred to herein as cell phones 112, and a plurality of laptops 114a and 114b, which are collectively referred to herein as laptops 114. The STB 110a may be installed in one or more commercial properties 104, the STB 110b and laptop 114b may be installed in one or more residential properties 106, the laptop 114a and the cell phone 112b may be located in one or more multi-tenant properties 108, and/or the cell phone 112a may be located within the sub-network 101. Notwithstanding, the invention may not be so limited and the plurality of endpoint devices may be located and/or installed in any other location, for example, an office without departing from the scope of the invention.

The commercial properties 104 may comprise, for example, stores, restaurants, offices, and municipal buildings. The residential properties 106 may comprise, for example, single-family homes, home offices, and/or townhouses. Multi-tenant properties 108 may comprise residential and/or commercial tenants such as apartments, condos, hotels, and/or high rises.

The management entity 102 may comprise suitable logic, circuitry, interfaces and/or code for managing operating parameters of one or more endpoint devices, for example, the STB 110b, the cell phone 112b, and/or the laptop 114b. The cell phones 112 and the laptops 114 may each comprise suitable logic, circuitry, interfaces and/or code that may be operable to communicate wirelessly utilizing one or more wireless standards such as IS-95, CDMA, EVDO, GSM, TDMA, GPRS, EDGE, UMTS/WCDMA, TD-SCDMA, HSPA (HSUPA and/or HSDPA), WIMAX and/or LTE. The cell phones 112 and the laptops 114 may be operable to communicate based on Bluetooth, Zigbee, WLAN and/or other suitable wireless technologies. The management entity 102 may be operable to provide access to the Internet and/or one or more private networks via one or more of optical, wired, and/or wireless connections. In various embodiments of the invention, the optical, wired, and/or wireless connections may comprise a broadband connection such as a digital subscriber line (DSL), Ethernet, passive optical network (PON), a T1/E1 line, a cable television infrastructure, a satellite television infrastructure, and/or a satellite broadband Internet connection.

The STBs 110 may comprise suitable logic, circuitry, interfaces and/or code that may be operable to connect to a display device, for example, a television set and an external source of signal from the management entity 102. The STBs 110 may be operable to convert the received signal from the management entity 102 to content, which may be displayed on a display device, for example, a television set. The STBs 110 may be operable to provide Internet connectivity, multimedia downloads and/or IP telephony sessions.

The cell phones 112 and/or laptops 114 may each comprise suitable logic, circuitry, interfaces, and/or code that may be operable to communicate utilizing one or more cellular standards. The cell phones 112 and/or laptops 114 may be operable to receive, process, and present multimedia content and may additionally be enabled to run a network browser or other applications for providing Internet services to a user of the cell phones 112 and/or laptops 114.

In operation, the management entity 102 may be operable to coordinate operation of one or more endpoint devices, for example, the STBs 110, the cell phones 112, and/or the laptops 114. One or more endpoint devices, for example, the STBs 110, the cell phones 112, and/or the laptops 114 may be operable to select one or more parameters associated with a particular content type from the management entity 102. The particular content type may specify a type of media content that is handled by the one or more endpoint devices, for example, the STBs 110, the cell phones 112, and/or the laptops 114. One or more endpoint devices, for example, the STBs 110, the cell phones 112, and/or the laptops 114 may be operable to receive configuration information from the management entity 102 based on the selected one or more parameters associated with the particular content type. One or more endpoint devices, for example, the STBs 110, the cell phones 112, and/or the laptops 114 may be operable to be configured utilizing the received configuration information. One or more endpoint devices, for example, the STBs 110, the cell phones 112, and/or the laptops 114 may be operable to pay for the received configuration information.

The received configuration information may comprise one or both of the one or more applications for the time period of accessing the one or more applications and/or one or more services for the time period of leasing the one or more services. The one or more endpoint devices, for example, the STBs 110, the cell phones 112, and/or the laptops 114 may be operable to pay for the received configuration information based on one or both of the selected bandwidth and/or the selected service class associated with the particular content type.

Figure 1B:
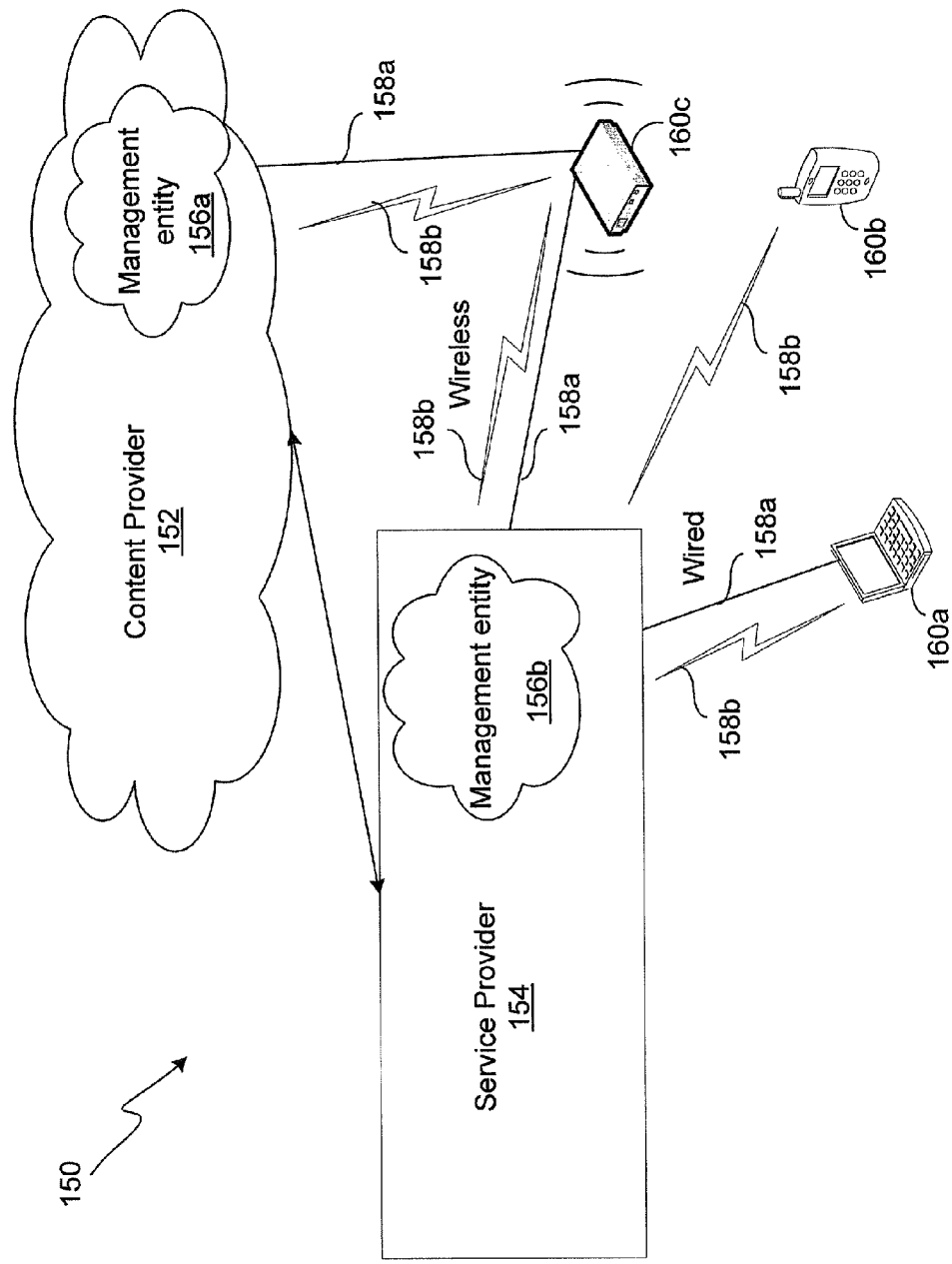
FIG. 1B is a diagram illustrating a system for content selection, delivery and payment comprising a service provider and a content provider, in accordance with an embodiment of the invention.

FIG. 1B is a diagram illustrating a system for content selection, delivery and payment comprising a service provider and a content provider, in accordance with an embodiment of the invention. Referring to FIG. 1B, there is shown a communication system 150. The communication system 150 may comprise a content provider 152, a service provider 154, wired 158a and/or wireless connections 158b, and a plurality of endpoint devices, for example, a laptop 160a, a cell phone 160b, and a set-top box (STB) 160c. The content provider 152 may comprise a management entity 156a and the service provider 154 may comprise a management entity 156b. The management entities 156a and 156b, the laptop 160a, the cell phone 160b, and the STB 160c may be substantially similar to the corresponding blocks as described with respect to FIG. 1A.

The content provider 152 may comprise suitable logic, circuitry, interfaces and/or code that may be operable to generate and/or provide a plurality of types of content, for example, audio data, video data and/or text data. The content provider 152 may be operable to communicate the received data to one or more endpoint devices, for example, the STB 160c, the laptop 160a and/or the cell phone 160b either directly or indirectly via the service provider 154, for example.

The service provider 154 may comprise suitable logic, circuitry, interfaces and/or code that may be operable to receive data from the content provider 152. The service provider 154 may be operable to communicate the received data to one or more endpoint devices, for example, the STB 160c, the laptop 160a and/or the cell phone 160b. The service provider 154 may be operable to provide access to the Internet, the content provider 152, and/or one or more private networks via one or more of optical, wired 158a, and/or wireless connections 158b. In various embodiments of the invention, the optical, wired 158a, and/or wireless connections 158b may comprise a broadband connection such as a digital subscriber line (DSL), Ethernet, passive optical network (PON), a T1/E1 line, a cable television infrastructure, a satellite television infrastructure, WiMAX, LTE, Wi-Fi, and/or a satellite broadband Internet connection.

In operation, the management entity 156a and/or 156b may be operable to coordinate operation of one or more endpoint devices, for example, the STB 160c, the cell phone 160b, and/or the laptop 160a. One or more endpoint devices, for example, the STB 160c, the cell phone 160b, and/or the laptop 160a may be operable to select one or more parameters associated with a particular content type from the management entity 156a and/or 156b. The particular content type may specify a type of media content that is handled by the one or more endpoint devices, for example, the STB 160c, the cell phone 160b, and/or the laptop 160a. The one or more parameters associated with the particular content type may comprise one or more of a bandwidth, a latency, a service class, one or more applications, a time period of accessing the one or more applications, one or more services, and/or a time period of leasing the one or more services.

One or more endpoint devices, for example, the STB 160c, the cell phone 160b, and/or the laptop 160a may be operable to receive configuration information from the management entity 156a and/or 156b based on the selected one or more parameters associated with the particular content type. One or more endpoint devices, for example, the STB 160c, the cell phone 160b, and/or the laptop 160a may be configured utilizing the received configuration information. One or more endpoint devices, for example, the STB 160c, the cell phone 160b, and/or the laptop 160a may be operable to pay for the received configuration information.

The received configuration information may comprise one or both of the one or more applications for the time period of accessing the one or more applications and/or one or more services for the time period of leasing the one or more services. The one or more endpoint devices, for example, the STB 160c, the cell phone 160b, and/or the laptop 160a may be operable to pay for the received configuration information based on one or both of the selected bandwidth and/or the selected service class associated with the particular content type.

Figure 2A:
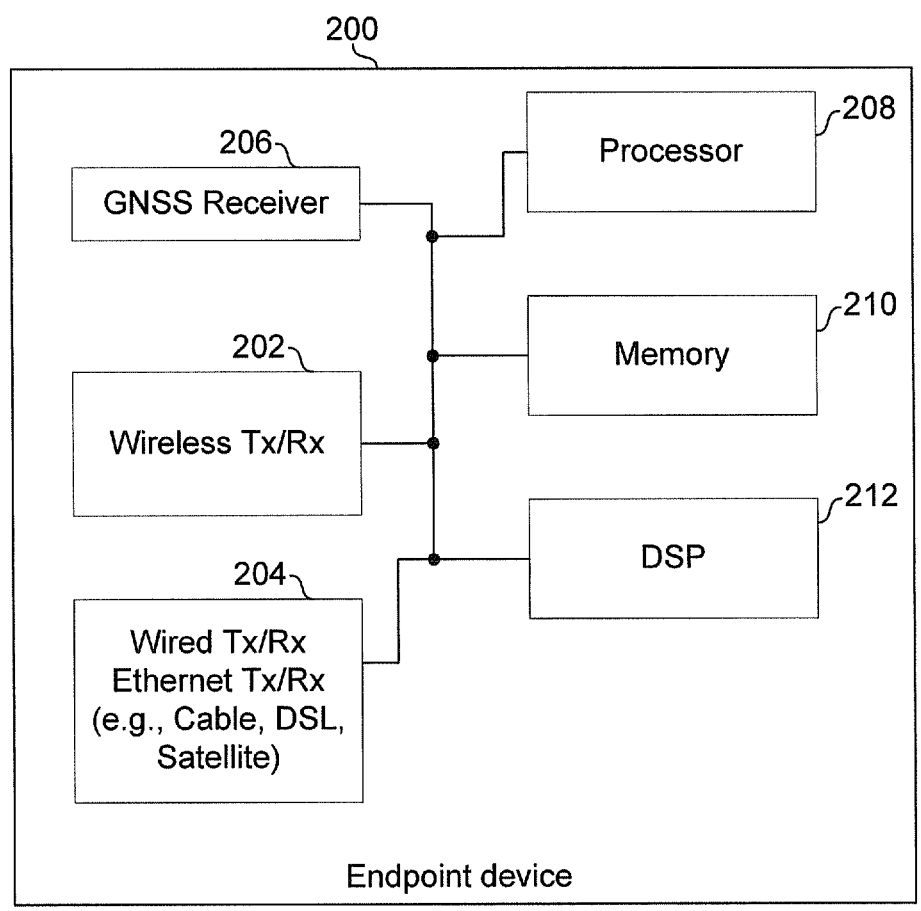
FIG. 2A is a block diagram of an exemplary endpoint device, in accordance with an embodiment of the invention.

FIG. 2A is a block diagram of an exemplary endpoint device, in accordance with an embodiment of the invention. Referring to FIG. 2A, there is shown a endpoint device 200. The endpoint device 200 may comprise a wireless Tx/Rx 202, a wired Tx/Rx 204, a GNSS receiver 206, a processor 208, a memory 210, and a DSP 212.

The wireless broadband Tx/Rx 202 may comprise suitable logic, circuitry, interfaces and/or code that may be operable to transmit and/or receive data, in adherence with one or more broadband communication standards, to and/or from the service provider 154 and/or the content provider 152 via the wireless connection 158b. The wireless broadband Tx/Rx 202 may be operable to perform amplification, down-conversion, filtering, demodulation, and analog to digital conversion of received signals. In addition, the wireless broadband Tx/Rx 202 may be operable to perform amplification, up-conversion, filtering, modulation, and digital to analog conversion of transmitted signals.

The wired Tx/Rx 204 may comprise suitable logic, circuitry, interfaces and/or code that may be operable to transmit and/or receive data to and/or from the service provider 154 and/or the content provider 152 via the wired connection 158a. For example, the wired Tx/Rx 204 may transmit and/or receive data via a T1/E1 line, PON, DSL, cable television infrastructure, satellite broadband internet connection and/or satellite television infrastructure for example. In various embodiments of the invention, the wired Tx/Rx 204 may be operable to perform exemplary operations and/or functions comprising amplification, down-conversion, filtering, demodulation, and analog to digital conversion of received signals. In addition, the wired Tx/Rx 204 may be operable to perform exemplary operations and/or functions comprising amplification, up-conversion, filtering, modulation, and digital to analog conversion of transmitted signals.

The GNSS receiver 206 may comprise suitable logic, circuitry, interfaces and/or code that may be operable to receive signals from one or more GNSS satellites, for example, GLONASS, GALILEO and/or GPS satellites. The received signals may comprise timing, ephemeris, long term orbit information, and/or almanac information that enable the GNSS receiver 206 to determine its location and/or time.

The processor 208 may comprise suitable logic, circuitry, interfaces and/or code that may be operable to process data and/or control operations of the endpoint device 200. In this regard, the processor 208 may be operable to provide control signals to the various other blocks within the endpoint device 200. The processor 208 may also control data transfers between various portions of the endpoint device 200. Additionally, the processor 208 may enable execution of applications programs and/or code. In various embodiments of the invention, the applications, programs, and/or code may enable, for example, parsing, transcoding and/or otherwise processing of data. The data may comprise multimedia data comprising voice, video, text, still images, and/or moving images. The processor 208 may be operable to communicate one or more parameters to the management entity 156a and/or 156b. The processor 208 may be operable to receive the configuration information from the service provider 154 and/or the content provider 154.

In various embodiments of the invention, the applications, programs, and/or code may be operable to, for example, configure and/or control operation of the wireless Tx/Rx 202 and/or wired Tx/Rx 204 and/or the GNSS receiver 206, the memory 210, and/or the DSP 212.

The memory 210 may comprise suitable logic, circuitry, interfaces and/or code that may enable storage or programming of information that comprises, for example, parameters and/or code that may effectuate the operation of the endpoint device 200. Exemplary parameters may comprise configuration data and exemplary code may comprise operational code such as software and/or firmware, but the information need not be limited in this regard. Additionally, the memory 210 may buffer or otherwise store received data and/or data to be transmitted. The memory 210 may be operable to store the configuration information from the service provider 154 and/or the content provider 154.

The DSP 212 may comprise suitable logic, circuitry, interfaces and/or code that may be operable to perform computationally intensive processing of data. The DSP 212 may be operable to handle exemplary operations comprising encoding, decoding, modulating, demodulating, encryption, decryption, scrambling, descrambling, and/or otherwise processing of data.

In operation, the processor 208 may be operable to select one or more parameters associated with a particular content type from the management entity 102. The particular content type may specify a type of media content that is handled by the endpoint device 200. The processor 208 may be operable to receive configuration information from the management entity 102 based on the selected one or more parameters associated with the particular content type. The processor 208 may be operable to configure the endpoint device 200 utilizing the received configuration information. The processor 208 may be operable to pay for the received configuration information.

Figure 2B:
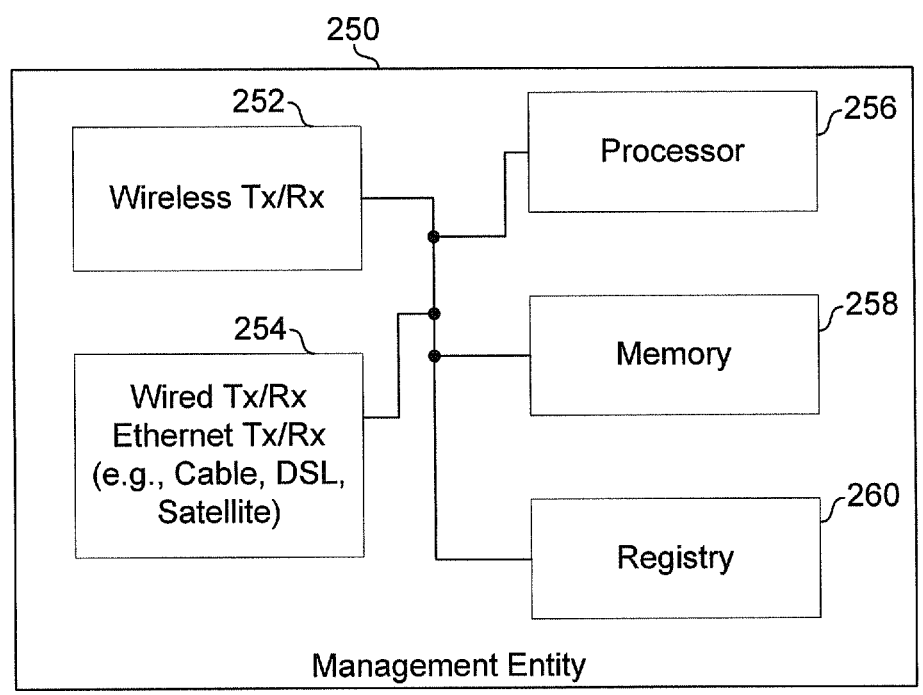
FIG. 2B is a block diagram of an exemplary management entity, in accordance with an embodiment of the invention.

FIG. 2B is a diagram illustrating an exemplary management entity, in accordance with an embodiment of the invention. Referring to FIG. 2B, there is shown a management entity 250. The management entity 250 may comprise a wireless Tx/Rx 252, a wired Tx/Rx 254, a processor 256, a memory 258, and a registry 260. The wireless Tx/Rx 252 and the wired Tx/Rx 254 may be substantially similar to the corresponding blocks as described with respect to FIG. 2A.

The processor 256 may comprise suitable logic, circuitry, interfaces and/or code that may be operable to receive one or more parameters from the endpoint device 200. The processor 256 may be operable to dynamically update a registry 260 based on the received one or more parameters from the endpoint device 200. The processor 256 may be operable to process data and/or control operations of the management entity 250. In this regard, the processor 256 may be operable to provide control signals to the various other blocks within the management entity 250. The processor 256 may also control data transfers between various portions of the management entity 250. Additionally, the processor 256 may enable execution of applications programs and/or code. In various embodiments of the invention, the applications, programs, and/or code may enable, for example, parsing, transcoding and/or otherwise processing data. The processor 256 may be operable to determine configuration information based on the received one or more parameters associated with the endpoint device 200 and the usage pattern associated with the endpoint device 200. The processor 256 may be operable to communicate the configuration information to the endpoint device 200.

In various embodiments of the invention, the applications, programs, and/or code may be operable to, for example, configure and/or control operation of the wireless Tx/Rx 252 and/or wired Tx/Rx 254, the memory 258, and/or the registry 260.

The memory 258 may comprise suitable logic, circuitry, and/or interfaces that may be operable to store or program information that includes, for example, parameters and/or code that may effectuate the operation of the management entity 250. Exemplary parameters may comprise configuration data and exemplary code may comprise operational code such as software and/or firmware, but the information need not be limited in this regard. Additionally, the memory 258 may buffer or otherwise store received data and/or data to be transmitted.

The registry 260 may comprise suitable logic, circuitry, interfaces and/or code that may be operable to store one or more of a bandwidth, a latency, a service class, one or more applications, a time period of accessing the one or more applications, one or more services, and/or a time period of leasing the one or more services. Notwithstanding, the invention may not be so limited, and the registry 260 may be stored in memory 258, or inside a CPU's registers or tightly-coupled memory (TCM), or one or more other storage devices, such as a hard drive, flash drive, or remotely over a network, for example, without limiting the scope of the invention.

In operation, the processor 256 may be operable to receive a command from the endpoint device 200 to select one or more parameters associated with a particular content type. The particular content type may specify a type of media content that is handled by the endpoint device 200. The processor 256 may be operable to determine configuration information based on the selected one or more parameters associated with the particular content type. The processor 256 may be operable to communicate the determined configuration information to the endpoint device 200. The processor 256 may be operable to receive payment for the communicated configuration information.

FIG. 3 is a diagram illustrating an exemplary registry in a management entity, in accordance with an embodiment of the invention. Referring to FIG. 3, the registry 300 comprises a plurality of endpoint device entries 302a, 302b, and 302c, collectively referred to herein as entries 302. The registry 300 may comprise one or more parameters that may be selected by the endpoint device 200 associated with a particular content type. The particular content type may specify a type of media content that is handled by the one or more endpoint devices. Although only three entries 302 are depicted, the invention may not be so limited and any number of entries may be presented, displayed and/or viewable in the registry 300. Each entry 302 may correspond to a particular content type, for example. Each entry 302 may comprise a name/description field 304, a service class 206, a GNSS coordinates field 308, a bandwidth usage field 310, an applications field 312, a time period of accessing applications field 314, a device capabilities field 316, a services field 318, a time period of leasing services field 320, and a latency field 322 corresponding to an endpoint device 200.

The name/description field 304 may provide information to uniquely describe the particular content type. The service class field 306 may comprise information regarding the designated service class for each content type. The GNSS coordinates field 308 may indicate the current GNSS coordinates where the particular content type is available. The bandwidth usage field 310 may indicate the amount of bandwidth used to view the particular content type. The applications field 312 may indicate the various applications associated with the particular content type. The time period of accessing applications field 314 may indicate a time period at which one or more of the applications are available to be accessed. The device capabilities field 316 may indicate the required device capabilities to access the particular content type, for example, the processor CPU speed, the amount of memory required, and a speed of one or more network connections required. The services field 318 may indicate the various services associated with the particular content type. The time period of leasing services field 320 may indicate a time period at which one or more of the services associated with the particular content type may be leased. The latency field 322 may indicate a guaranteed latency associated with the particular content type.

In operation, the endpoint device 200 may be operable to select one or more parameters from the registry 300 associated with a particular content type. The management entity 250 may be operable to determine configuration information based on the selected one or more parameters. The configuration information may be utilized by the endpoint device 200 to access one or more applications associated with the particular content type at a designated time and/or at a designated location based on the availability of bandwidth, the latency guaranteed, the service class, and the device capabilities of the endpoint device 200. The configuration information may be utilized by the endpoint device 200 to lease one or more services associated with the particular content type at a designated time and/or at a designated location based on the availability of bandwidth, the service class, and the device capabilities of the endpoint device 200.

Figure 4:
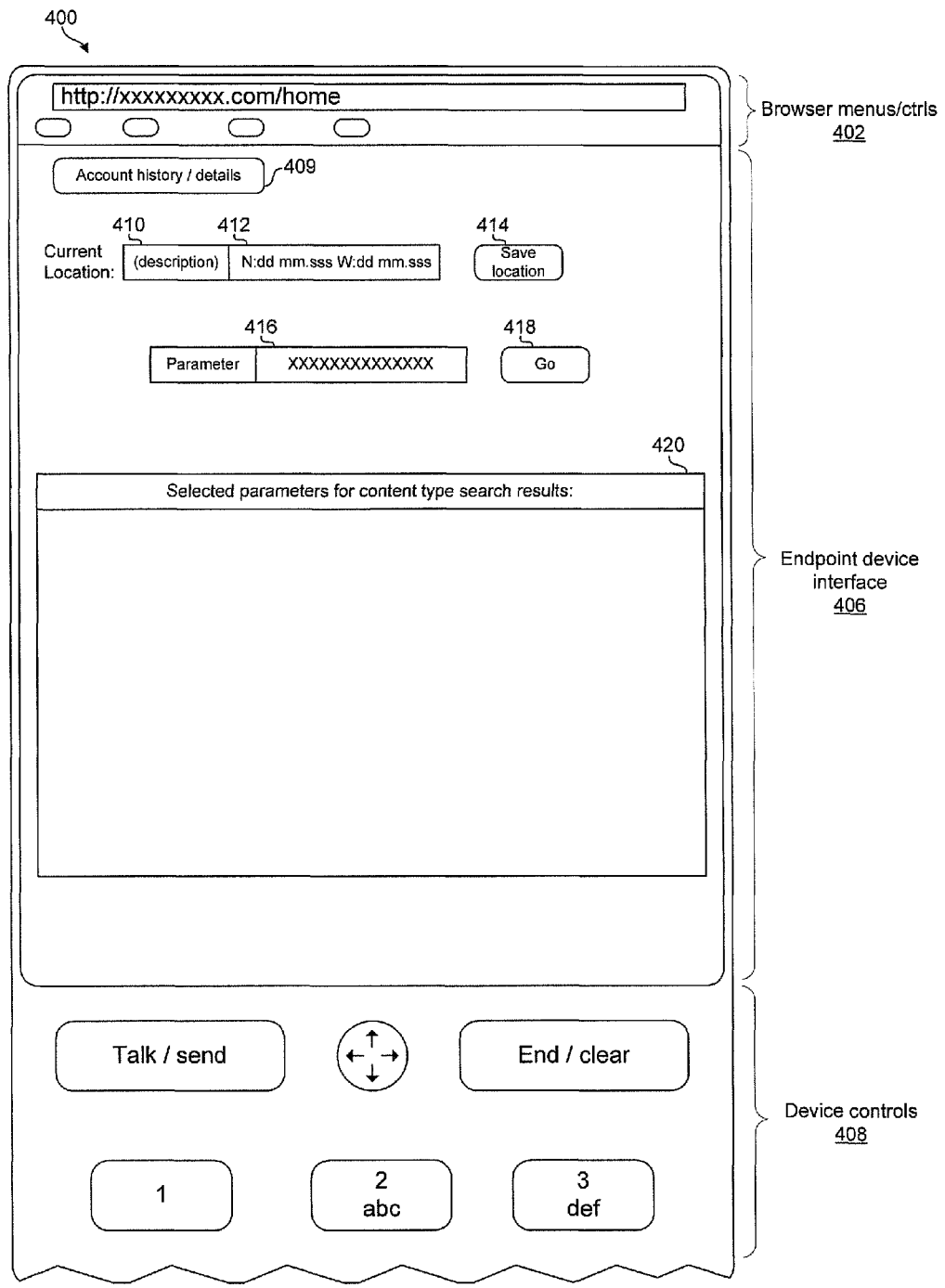
FIG. 4 is a diagram illustrating an exemplary interface for an endpoint device, in accordance with an embodiment of the invention.

FIG. 4 is a diagram illustrating an exemplary interface for an endpoint device, in accordance with an embodiment of the invention. Referring to FIG. 4, there is shown a portion of an endpoint device 400 communicatively coupled to a management entity 102. In an exemplary embodiment of the invention illustrated in FIG. 4, the endpoint device 400 may comprise, for example, a STB 110, a cell phone 112, and/or a laptop 114. The management entity 102 may be accessed via, for example, an interface utilizing one or more application layer protocols, a proprietary language, or mark-up languages, such as web browser on the endpoint device 400. However, the invention may not be so limited and the management entity 102 may be accessed from an end-user communication device that is not a cellular enabled communication device. In such instances, the management entity 102 may be operable to select from one or more endpoint devices associated with a user's account or profile on the management entity 102. In this manner, preferences, permissions, and/or locations for a plurality of endpoint devices may be managed from a single endpoint device 400.

Referring to FIG. 4, below the browser menus and/or controls 402, the endpoint device interface 406 may comprise fields 410, 412 and 416, buttons 409, 414 and 418, and search results window 420. Notwithstanding, the interface illustrated in FIG. 4 is only exemplary and an actual endpoint device interface may comprise fewer, different, and/or additional components.

The browser menus and/or controls 402 may be conventional menus and/or controls utilized for actions such as navigating web pages, printing web pages, configuring browser options, and setting user preferences.

In various embodiments of the invention, accessing an account history and/or details button 409 may bring up a web page and/or window that displays past usage for the endpoint device 400, for example, the previously selected parameters from the management entity 102, such as a bandwidth, a latency, a service class, one or more applications, a time period of accessing the one or more applications, one or more services, and/or a time period of leasing the one or more services, and a current balance of money owed by endpoint device 400 for receiving configuration information from the management entity 102.

The field 410 may comprise a name or identifier, if any, assigned to the current location of the endpoint device 400. In this regard, a user of the endpoint device 400 may, via the field 412, assign an alphanumeric name or other identifier to the GNSS coordinates or a range of GNSS coordinates. Furthermore, the location, and/or preferences for the location may be saved in local memory on the endpoint device 400. For example, "home" and "work" may be two commonly saved locations. Accordingly, a user may quickly locate one or more services near saved locations during subsequent visits to the locations.

The field 412 may identify the GNSS coordinates of the current location of the endpoint device 400. In various embodiments of the invention, a range of GNSS coordinates may be associated with a single location. In this regard, a radius preference may be configurable and may determine how large of an area may be considered to be a single location. The radius for each location may be determined, for example, based on the transmit strength of an endpoint device 400.

In an exemplary embodiment of the invention, clicking the button 414 may display a web page and/or interface that may enable assigning a name to the current location. The current location may be saved to a local memory in the endpoint device 400 and/or to a profile maintained in the management entity 102. Additionally, saving locations may enable identifying one or more services near a location even when the endpoint device 400 is not at that location and/or when the endpoint device 400 cannot access the management entity 102. When saving a location, search results for one or more services near that location may also be saved.

In an exemplary embodiment of the invention, one or more parameters at the management entity 102 may be searched using the field 416. By clicking the button 418 may display a web page and/or interface in the search results window 420 that may list the available parameters to be selected at the management entity 102. When one or more parameters have been selected by the endpoint device 400, clicking the button 418 may display a web page and/or interface that may enable viewing details of the configuration information for the endpoint device 400 in the search results window 420. For example, the details may provide, where applicable, one or more applications for the time period of accessing the one or more applications, one or more services for the time period of leasing the one or more services, and the cost of the received configuration information based on one or more of the selected bandwidth, the selected service class associated with the particular content type, and/or the GNSS location of the endpoint device 400.

The endpoint device 400 device controls 408 may comprise hard and/or soft buttons to enable user interaction with the endpoint device 400. Exemplary controls may comprise a touch screen, voice activation, an alphanumeric keypad, a scroll wheel, a roller ball, and/or a multi-directional button.

In operation, a user of the endpoint device 400 may open a web browser or other interface on the endpoint device 400 and navigate to the management entity 102. In an exemplary embodiment of the invention, the user may provide a username and password to authenticate the user and/or the endpoint device 400 to the management entity 102. The location may be automatically determined independent of user input. For example, in instances where the endpoint device 400 is located at the desired location, the location may be determined via GPS device or AGPS server. In other instances, the user may also enter the GNSS address of the endpoint device 400 to determine the available services in the vicinity of the endpoint device 400.

The user may search for one or more parameters near the user's current location or in a different location. Upon receiving a list of potential parameters to be selected in the search results window 420, the user may select one or more parameters associated with a particular content type from the management entity 102. The endpoint device 400 may be operable to receive configuration information from the management entity 102 based on the selected one or more parameters. The endpoint device 400 may be operable to configure itself based on the received configuration information from the management entity 102 and pay for the received configuration information from the management entity 102.

Figure 5:
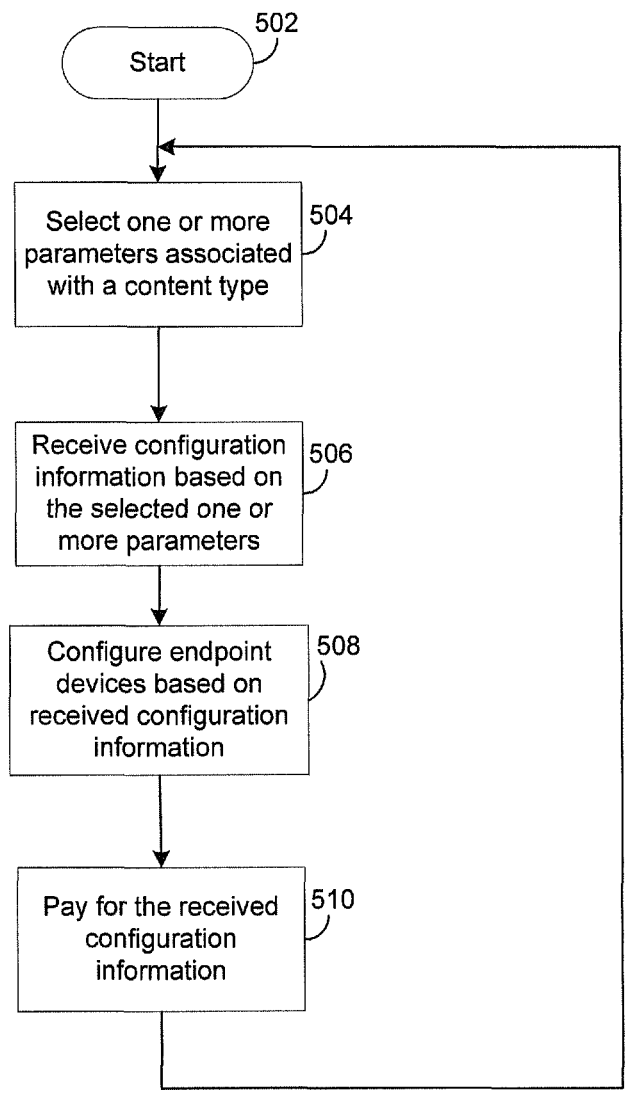
FIG. 5 is a flow chart illustrating exemplary steps for content selection, delivery and payment, in accordance with an embodiment of the invention.

FIG. 5 is a flow chart illustrating exemplary steps for content selection, delivery and payment, in accordance with an embodiment of the invention. Referring to FIG. 5, exemplary steps may begin at step 502. In step 504, the endpoint device 200 may be operable to select one or more parameters associated with a particular content type from the management entity 250. In step 506, the endpoint device 200 may be operable to receive configuration information from the management entity 250 based on the selected one or more parameters. In step 508, the endpoint device 200 may be operable to configure itself based on the received configuration information from the management entity 250. In step 510, the endpoint device 200 may be operable to provide payment or compensation for the received configuration information from the management entity 250. Control then returns to step 504.

In accordance with an embodiment of the invention, a method and system for content selection, delivery and payment may comprise a communication system 100 (FIG. 1A). The communication system 100 may comprise a management entity 102 (FIG. 1A) that may be operable to coordinate operation of one or more endpoint devices, for example, the STB 110*a* (FIG. 1A), the cell phone 112*a* (FIG. 1A), and/or the laptop 114*a* (FIG. 1A). One or more processors, for example, the processor 208 and/or circuits for use in the one or more endpoint devices, for example, the STB 110*a*, the cell phone 112*a*, and/or the laptop 114*a* may be operable to select one or more parameters associated with a particular content type from the management entity 102. The particular content type may specify a type of media content that is handled by the one or more endpoint devices, for example, the STB 110*a*, the cell phone 112*a*, and/or the laptop 114*a*. One or more processors, for example, the processor 208 and/or circuits for use in the one or more endpoint devices, for example, the STB 110*a*, the cell phone 112*a*, and/or the laptop 114*a* may be operable to receive configuration information from the management entity 102 based on the selected one or more parameters associated with the particular content type. One or more processors, for example, the processor 208 and/or circuits for use in the one or more endpoint devices, for example, the STB 110*a*, the cell phone 112*a*, and/or the laptop 114*a* may be operable to configure the endpoint device 200 utilizing the received configuration information. One or more processors, for example, the processor 208 and/or circuits for use in the one or more endpoint devices, for example, the STB 110*a*, the cell phone 112*a*, and/or the laptop 114*a* may be operable to pay for the received configuration information.

In accordance with another embodiment of the invention, the one or more parameters associated with the particular content type may comprise one or more of a bandwidth, a latency, a service class, one or more applications, a time period of accessing the one or more applications, one or more services, and/or a time period of leasing the one or more services. The received configuration information may comprise one or both of the one or more applications for the time period of accessing the one or more applications and/or one or more services for the time period of leasing the one or more services. One or more processors, for example, the processor 208 and/or circuits for use in the one or more endpoint devices, for example, the STB 110*a*, the cell phone 112*a*, and/or the laptop 114*a* may be operable to pay for the received configuration information based on one or both of the selected bandwidth and/or the selected service class associated with the particular content type.

In accordance with another embodiment of the invention, one or more processors, for example, the processor 208 and/or circuits for use in the one or more endpoint devices, for example, the STB 110*a*, the cell phone 112*a*, and/or the laptop 114*a* may be operable to communicate a GNSS location of each of the one or more endpoint devices, for example, the STB 110*a*, the cell phone 112*a*, and/or the laptop 114*a* to the management entity 102. One or more processors, for example, the processor 208 and/or circuits for use in the one or more endpoint devices, for example, the STB 110*a*, the cell phone 112*a*, and/or the laptop 114*a* may be operable to provide payment or compensation for the received configuration information based on the GNSS location of the one or more endpoint devices, for example, the STB 110*a*, the cell phone 112*a*, and/or the laptop 114*a*. One or more processors, for example, the processor 208 and/or circuits for use in the one or more endpoint devices, for example, the STB 110*a*, the cell phone 112*a*, and/or the laptop 114*a* may be operable to receive the selected one or more parameters via one or both of a wireless 158*b* and/or a wired connection 158*a*. The management entity 102 may be one or both of a content provider 152 and/or a service provider 154.

Another embodiment of the invention may provide a machine and/or computer readable storage and/or medium, having stored thereon, a machine code and/or a computer program having at least one code section executable by a machine and/or a computer, thereby causing the machine and/or computer to perform the steps as described herein for content selection, delivery and payment.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A network management entity comprising:
  a registry to store a plurality of entries, each respective entry of the plurality of entries corresponding to a respective content type of a plurality of content types of content that is ready to be delivered from a remote content provider to a respective endpoint device of a plurality of endpoint devices in a sub-network associated with the network management entity for handling by the respective endpoint device, the plurality of content types including one or more of audio data, video data or text data, each respective entry including data defining one or more parameters controlling communication of the respective content type to the respective endpoint device;
  a communication circuit configured for data communication over the sub-network with the plurality of endpoint devices on the sub-network to enable the plurality of endpoint devices to access content from the remote content provider, the communication circuit configured to:

provide to an endpoint device of the plurality of endpoint devices on the sub-network information about a plurality of parameters related to content, having a particular content type, available from the remote content provider, and receive from the endpoint device in the sub-network a command communication specifying one or more parameters of the plurality of parameters, the specified one or more parameters related to content to be received by the endpoint device from the remote content provider;

a processor in data communication with the registry and the communication circuit and configured to:

receive from the communication circuit the one or more parameters specified in the command communication, and, using the one or more parameters, select from the registry configuration information for a specified content type of the plurality of content types for the content to be accessed from the remote content provider; and the communication circuit further configured to:

communicate the selected configuration information to the endpoint device for use by the endpoint device in configuring the endpoint device for accessing the content from the remote content provider.

2. The network management entity of claim 1 wherein the processor is operative to select configuration information suitable for use by the endpoint device to configure itself to access one or more applications associated with a respective content type.

3. The network management entity of claim 2 wherein the processor is operative to select configuration information for use by the endpoint device to access the one or more applications at a designated time or a designated location of the endpoint device.

4. The network management entity of claim 1 wherein the processor is operative to select from the registry an entry including configuration information suitable for use by the endpoint device to access, at a designated time period, one or more services associated with the content that is ready to be delivered to the endpoint device, the one or more services indicated in the selected entry by a first parameter of the one or more parameters, the designated time period indicated in the selected entry by a second parameter of the plurality of parameters.

5. The network management entity of claim 1 wherein the processor is operative to provide through the communication circuit to the endpoint device a web page showing available content type parameters including past usage for previously selected parameters and to receive from the endpoint device through the communication circuit a command from the endpoint device to select one or more content type parameters associated with a particular content type.

6. The network management entity of claim 1 wherein the communication circuit is operative to interact with a web browser operating on the endpoint device to provide the information about the plurality of parameters related to content available from the remote content provider and available to be selected via the web browser and to subsequently receive from the web browser of the endpoint device the one or more parameters related to content to be received by the endpoint device.

7. The network management entity of claim 1 wherein the one or more parameters related to content to be received by the endpoint device comprise one or more of: a bandwidth, a latency, a service class, one or more applications, a time period of accessing said one or more applications, one or more services, or a time period of leasing said one or more services.

8. The network management entity of claim 1 wherein the communication circuit is further operative to:

receive from the endpoint device a global navigation satellite system (GNSS) location of the endpoint device; and using the GNSS location of the endpoint device, provide through the communication circuit to the endpoint device the information about the plurality of parameters near a location specified by the GNSS location of the endpoint device.

9. The network management entity of claim 8 wherein the network management entity is operable to dynamically update the registry based on the specified one or more parameters.

10. The network management entity of claim 1 wherein the processor is operative to provide through the communication circuit to the endpoint device a web page showing available content type parameters and to receive from the endpoint device through the communication circuit a command from the endpoint device to select one or more content type parameters associated with a particular content type.

11. An endpoint device comprising:

a communication circuit operative to communicate over a sub-network with a network management entity that manages communication on the sub-network with a plurality of endpoint devices including the endpoint device;

a user interface including a web browser configured for operation by a user of the endpoint device, the user interface operable to:

display on the web browser a list of parameters available at a location of the endpoint device, receive from the user of the endpoint device a selection of one or more parameters associated with a particular content type of a plurality of available content types for media to be delivered to the endpoint device from a remote content provider, the plurality of available content types including audio data, video data or text data; and a processor in data communication with the communication circuit and the user interface, the processor operative to:

receive the one or more parameters selected by the user of the endpoint device from the user interface, provide the one or more parameters selected by the user of the endpoint device to the communication circuit for communication on the sub-network to the network management entity, receive on the sub-network from the communication circuit configuration information from the network management entity, the configuration information selected by the network management entity using location information about current location of the endpoint device and the one or more parameters selected by the user of the endpoint device, the received configuration information including information to adapt operation of the endpoint device to access content of the particular content type from the remote content provider at the current location of the endpoint device, and configure the endpoint device using the received configuration information.

12. The endpoint device of claim 11 wherein the user interface comprises:
   a display device; and
   a web browser for entry of information by the user and for display of information to the user on the display device.

13. The endpoint device of claim 12 wherein the user interface comprises:
   an account history button,
   wherein the plurality of available content types for media to be delivered to the endpoint device includes network services and network applications, and wherein the processor is responsive to actuation of the account history button to cause the display device to show on the web browser a web page that displays past usage of network services or network applications by the endpoint device.

14. The endpoint device of claim 13 wherein the processor is further operative to cause the display device to show previously selected parameters associated with a particular content type for media to be delivered to the endpoint device.

15. The endpoint device of claim 14 wherein the user interface comprises a search field operative to receive a search request and wherein the processor is further operative to cause the display device to show available parameters associated with a particular content type to be selected at the network management entity.

16. The endpoint device of claim 15 wherein the processor is operative to cause the display device to show applications or services available on the network and a time period for accessing the applications and services.

17. The endpoint device of claim 16 wherein the processor is operative to cause the display device to show information about cost of the received configuration information for the applications or services available on the network.

18. The endpoint device of claim 17 wherein the processor is operative to cause the display device to show information about the cost based on a selected bandwidth of communication in the network.

19. The endpoint device of claim 17 wherein the processor is operative to cause the display device to show information about the cost based on a geographic location of the endpoint device.

20. A method comprising:
   at a network management entity,
   storing in a memory a plurality of entries, each respective entry of the plurality of entries corresponding to a respective content type of a plurality of content types of content that is ready to be delivered to a respective endpoint device of a plurality of endpoint devices in a network associated with the network management entity for handling by the respective endpoint device, the plurality of content types selected from a group including audio data, video data or text data, each respective entry including information about the respective content type and defining communication requirements of a respective endpoint device for accessing the respective content type by the respective endpoint device from a remote content provider;
   providing over a communication sub-network to an endpoint device a web page showing available content type parameters for the plurality of available content types;
   receiving over the communication sub-network information about a geographical location of the endpoint device;
   receiving over the communication sub-network from the web page at the endpoint device a command communication specifying one or more parameters for a specified content type of the plurality of available content types, the specified content type related to content to be received by the endpoint device at the geographic location of the endpoint device and selected by a user of the endpoint device using the web page, the endpoint device being one of a plurality of endpoint devices configured to access content from the remote content provider under control of a service provider operating the network management entity;
   using the geographical location of the endpoint device and the received parameters specified in the command communication, selecting from the memory configuration information for the specified content type for the content to be accessed by the endpoint device from the remote content provider, at the geographical location of the endpoint device; and communicating the selected configuration information to the endpoint device for use by the endpoint device in accessing the content from the remote content provide.

21. The method of claim 20 wherein receiving over the communication sub-network information about the geographical location of the endpoint device comprises receiving from the endpoint device global navigation satellite system (GNSS) information defining the geographical location of the endpoint device.

22. The method of claim 20 wherein selecting from the memory configuration information for the specified content type for the content to be accessed by the endpoint device from the remote content provider comprises selecting as the configuration information one or both of
   one or more applications for execution by the endpoint device for a time period of accessing the one or more applications; or
   one or more services for execution by the endpoint device for a time period of leasing the one or more services.

* * * * *